United States Patent [19]

Wozny

[11] 4,145,489
[45] Mar. 20, 1979

[54] HIGH NITRILE POLYMER COMPOSITIONS CONTAINING GLUTARALDEHYDE

[75] Inventor: Mary E. Wozny, Coolville, Ohio

[73] Assignee: Borg-Warner Corporation, Chicago, Ill.

[21] Appl. No.: 818,185

[22] Filed: Jul. 22, 1977

[51] Int. Cl.² ............................................. C08K 5/07
[52] U.S. Cl. ....................................... 526/1; 260/879
[58] Field of Search ..................... 526/1, 341, 342; 260/879, 32.8 N, 45.7 R

[56] References Cited

U.S. PATENT DOCUMENTS

| | | | |
|---|---|---|---|
| 2,753,320 | 7/1956 | Siedschlag | 260/45.7 R |
| 2,946,760 | 7/1960 | DeWitt | 260/45.7 R |
| 3,870,802 | 3/1975 | Harris | 260/848 |
| 3,947,431 | 3/1976 | Gomez | 260/881 |

*Primary Examiner*—Paul R. Michl
*Attorney, Agent, or Firm*—Richard J. Schlott

[57] ABSTRACT

High nitrile polymer compositions which are useful as packaging materials comprising a high nitrile resin and glutaraldehyde, and a method for preparing high nitrile resins having a low extractable cyanide level.

3 Claims, No Drawings

HIGH NITRILE POLYMER COMPOSITIONS CONTAINING GLUTARALDEHYDE

BACKGROUND OF THE INVENTION

The present invention relates to compositions comprising nitrile resins and glutaraldehyde which have low extractable HCN content and which are useful as packaging materials.

In recent years it has been discovered that certain polymeric nitrile resins are especially suitable for packaging applications because of their excellent water and oxygen barrier properties. Even though such nitrile polymers have excellent barrier properties they may be unsuitable for certain packaging applications because they contain trace, though detectable, amounts of hydrogen cyanide (HCN).

The amount of HCN in such nitrile polymers will vary with the nitrile monomer, the total nitrile content of the polymer, the polymerization method used to prepare the polymer, the processing and thermal history of the polymer and other factors. Moreover, it has been found that the amount of extractable HCN in nitrile polymers may be increased after the polymer has been subjected to forming operations wherein the polymer has been heated in order to soften and/or melt the polymer prior to forming it into shaped articles.

The trace amount of extractable HCN present in such nitrile packaging materials is very low and presents no known health or safety problems. However, minor amounts of HCN, if extracted by the contents of the package, will impart a taste. The problem of HCN extraction as it affects taste is thus of concern in the packaging of foods which are in prolonged intimate contact with the container.

Recently it was discovered that the extractable HCN content of packaging materials prepared from high nitrile polymers can be reduced by compounding the nitrile polymer with a formaldehyde compound prior to the fabrication of the packaging material as is disclosed in U.S. Pat. No. 3,870,802. However, excess formaldehyde may remain in the packaging material and impart an undesirable taste to packaged foods. It then becomes necessary to resort to further processing steps in order to reduce the level of extractable formaldehyde, using methods such as are disclosed in U.S. Pat. No. 3,947,431.

Nitrile resin compositions for use as packaging resins having very low extractable HCN content and not containing further taste-producing substances requiring removal by subsequent processing steps would thus be a substantial advance in the packaging art.

DETAILED DESCRIPTION OF THE INVENTION

The high nitrile resins used in the present invention are copolymers, and contain greater than 50% by weight of a nitrile monomer based on the total polymer weight. The nitrile monomers include acrylonitrile, methacrylonitrile, ethacrylonitrile, propacrylonitrile, glutaronitrile, methylene-glutaronitrile, fumaronitrile, etc., as well as mixtures of these monomers. The preferred comonomers which are copolymerized with the nitrile monomers include aromatic monomers such as styrene and alpha-methylstryene, acrylic acid and methacrylic acid and the corresponding acrylate and methacrylate esters containing 1 to 4 carbon atoms such as methyl acrylate, ethyl acrylate, propyl acrylate, butyl acrylate and the corresponding methacrylates; and mixtures of the foregoing.

Optionally, the high nitrile resins may contain from 0–25% by weight of a synthetic or natural rubber component such as polybutadiene, rubbery styrene-butadiene copolymers (SBR), isoprene, neoprene, nitrile rubbers, acrylate rubbers, natural rubbers, acrylonitrile-butadiene copolymers, ethylene-propylene copolymers, chlorinated rubbers, etc., which is used to toughen the high nitrile resins. This rubbery component may be incorporated into the high nitrile resin by any of the methods which are well known to those skilled in the art, e.g., direct polymerization of monomers, grafting the nitrile monomer onto the rubbery backbone, polyblending of a rubber graft polymer with a rigid polymer or copolymer, etc.

The preferred nitrile resins for those packaging applications requiring excellent oxygen and water vapor barrier properties in the packaging materials are those nitrile resins containing greater than 50% by weight, based on the total polymer weight, of a nitrile monomer selected from the group consisting of acrylonitrile and mixtures of acrylonitrile and methacrylonitrile. The preferred comonomers are styrene, alphamethylstyrene and methylmethacrylate. Also preferred are terpolymers such as acrylonitrile/methacrylonitrile/styrene; and acrylonitrile/styrene/methyl methacrylate.

The high nitrile resin is blended with an effective amount of glutaraldehyde to give a resin composition having very low extractable cyanide. In general the amount of glutaraldehyde employed will be greater than about 0.05 parts by weight per hundred parts by weight of high nitrile resin. To ensure a low level of extractable cyanide, greater than about 0.1 part by weight glutaraldehyde per hundred parts of resin will preferably be employed. The amount of glutaraldehyde employed will preferably not exceed 0.50 parts by weight per hundred parts resin. Although amounts greater than 0.5 parts will be effective in reducing the level of extractable cyanide, large amounts are neither necessary nor desirable for most food packaging applications.

The actual measurement of the amount of cyanide extracted by the extraction liquid is not considered to be a part of this invention. In this regard, any method capable of detecting amounts of cyanide as low as 0.02 ppm can be used. These methods, which are well known to those skilled in the art, include colorimetric, fluorimetric, gas chromatographic and electrochemical methods.

Tests to determine the amount of extractable HCN and formaldehyde in packaging material prepared from nitrile resins are run on 16 ounce beverage bottles. The extraction tests are run for 10 days at 49° C. using a 3% acetic acid solution (an FDA simulant for acid type foods), 8% ethanol and water as the extracting liquids. This illustrates one of the more difficult packaging applications where there is a high probability of extracting HCN.

In many instances it is more convenient to run HCN extraction tests on molded test samples such as extruded strips or other convenient shapes rather than on bottles or other packaging material. In this event, the ratio of the surface of the test sample extracting liquid should be in the range of 10 ml/in$^2$ in order to simulate extraction tests for most packaging applications.

The following Examples are set forth in illustration of the present invention and should not be construed as limitations thereof. All parts and percentages of nitrile polymer and glutaraldehyde are by weight unless otherwise specified. The ppm values for extracted HCN refers to micrograms of HCN per gram of extracting liquid.

EXAMPLES 1–5

Blends were prepared by adding the 0.25 parts by weight of additive to 100 parts by weight of powdered resin and milling the mixture on a two-roll laboratory mill at 330° F. for 3 to 4 minutes. The blends were then sheeted-out, cooled and chopped or ground.

Test strips were prepared from the milled blends by extrusion, using a Brabender extruder fitted with a 2" ribbon die and zone temperatures of 400°, 415°, and 430° F., and a die temperature of 420° F. The cooled ribbon was cut into strips for extraction studies.

The extractions were run by immersing the strips in water (10 ml. H$_2$O per sq. in. of strip surface) and maintaining at 150° F. for 11 days in a constant temperature oven. The water was then analyzed for cyanide ion. The compositions and cyanide analyses are reported in Table I.

Table I

| Comparison of Resin-Additive Blends; Cyanide Extraction of Extruded Strips with H$_2$O | | |
|---|---|---|
| Example No. | Additive[1] | PPM Cyanide Extracted |
| 1 | None | 0.24 |
| 2 | Glutaraldehyde[2] | 0.02 |
| 3 | D-Glucose | 0.26 |
| 4 | Fructose | 0.25 |
| 5 | Polyvinyl Butyral | 0.15 |

Notes:
[1]0.25 pbw additive per 100 pbw of a graft polymer having a rigid phase of 22% styrene, 55% acrylonitrile and 5% methyl methacrylate and 18% SBR rubber phase.
[2]Added as 25% aqueous glutaraldehyde solution.

It will be apparent from these data that blends containing the high nitrile resin and glutaraldehyde (Example 2) have less than 1/10 the extractable cyanide level as compared with a control blend containing no additive (Example 1).

That reduction of cyanide content is not predictable is shown by comparative examples 3–5, wherein an aldohexose (D-glucose, Example 3), a ketohexose (fructose, Example 4) and a polymeric acetal (polyvinyl butyral, Example 5) are ineffective in this application.

EXAMPLES 6–8

More extensive extraction studies are run with food simulating solvents including 3% acetic acid, water and 8% ethanol in 16 oz. Boston round bottles, molded from resin-glutaraldehyde blends compounded in an extruder. Extraction studies are summarized below in Table II.

Table II

| Resin-Glutaraldehyde Blends (100 pbw resin/0.15 pbw Glutaraldehyde Bottle Extraction Data. | | | | |
|---|---|---|---|---|
| Example No. | Resin[1] | Cyanide Extracted, ppm[2] | | |
| | | 3% Acetic Acid | H$_2$O | 8% Ethanol |
| 6 | A | 0.04 | 0.03 | 0.04 |
| 7 | B | 0.05 | 0.03 | 0.08 |
| 8 | C | 0.05 | 0.06 | 0.04 |

Notes:
[1]Resin A is 60% acrylonitrile, 40% styrene. B is 70% acrylonitrile 23% styrene, grafted on 5% SBR rubber phase. C is 75% acrylonitrile 25% styrene.
[2]Extractions at 120° F., 10 days. Bottles filled with boiling liquid to start.

It will be seen from the extraction data in Table II that compositions comprising high nitrile resin and glutaraldehyde have remarkably low levels of extractable cyanide.

The invention, as shown by the illustrative Examples, is a composition comprising a high nitrile resin and from 0.05 to 0.50 parts by weight glutaraldehyde per hundred parts by weight of resin. The resulting compositions contain very low levels of extractable cyanide, and the invention therefore is also a method for preparing high nitrile resin compositions having a lowered extractable cyanide content by blending therewith from about 0.05 parts by weight glutaldehyde per hundred parts resin.

Various further modifications of the instant invention are possible including the addition of various stabilizers, pigments, dyes, fillers, and the like, as will be apparent to those skilled in the art. The resulting compositions in the form of bottles and films are particularly useful for packaging foodstuffs where the presence of extractable cyanide ion may impart undesirable flavor and taste characteristics to the contents thereof.

It will be apparent that the various Examples are provided by way of illustration and many variations may be made in the products and processes set forth above without departing from the scope and spirit of this invention.

We claim:

1. An essentially solvent-free resin composition consisting of one hundred parts by weight of a high nitrile polymer and from 0.05 to 0.50 parts by weight of glutaraldehyde, said high nitrile polymer containing greater than 50% by weight nitrile monomer based on total polymer weight.

2. The composition of claim 1 wherein the nitrile monomer is selected from the group consisting of acrylonitrile methacrylonitrile, and mixtures thereof.

3. The composition of claim 1 wherein said high nitrile polymer is a composition consisting of a nitrile monomer selected from the group consisting of acrylonitrile, methacrylonitrile and mixtures thereof; at least one comonomer selected from the group consisting of styrene, alpha methylstyrene, and methylmethacrylate; and from 0 to 25% by weight of a rubbery polymer selected from the group consisting of polybutadiene, rubbery copolymers of styrene and butadiene, nitrile rubbers and acrylate rubbers.

* * * * *